United States Patent
Pierson et al.

(10) Patent No.: US 9,781,439 B2
(45) Date of Patent: Oct. 3, 2017

(54) COMBINED PARALLEL AND PIPELINED VIDEO ENCODER

(71) Applicant: Optis Circuit Technology, LLC, Plano, TX (US)

(72) Inventors: Valerie Pierson, Saint Martin D'heres (FR); Vincent Migeotte, Saint-Egreve (FR)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 125 days.

(21) Appl. No.: 14/761,821

(22) PCT Filed: Jan. 28, 2014

(86) PCT No.: PCT/EP2014/051620
§ 371 (c)(1),
(2) Date: Jul. 17, 2015

(87) PCT Pub. No.: WO2014/127961
PCT Pub. Date: Aug. 28, 2014

(65) Prior Publication Data
US 2015/0358630 A1    Dec. 10, 2015

Related U.S. Application Data

(60) Provisional application No. 61/802,921, filed on Mar. 18, 2013.

(30) Foreign Application Priority Data

Feb. 21, 2013    (EP) .................................... 13305197

(51) Int. Cl.
*H04N 19/42*    (2014.01)
*H04N 19/50*    (2014.01)
*H04N 19/436*    (2014.01)

(52) U.S. Cl.
CPC ........... *H04N 19/42* (2014.11); *H04N 19/436* (2014.11); *H04N 19/50* (2014.11)

(58) Field of Classification Search
CPC ....... H04N 19/42; H04N 19/50; H04N 19/436
See application file for complete search history.

(56) References Cited

U.S. PATENT DOCUMENTS

| 2009/0002379 A1* | 1/2009 | Baeza ....................... G06T 1/20 345/522 |
| 2009/0274213 A1 | 11/2009 | Zhou et al. |
| 2013/0089149 A1* | 4/2013 | Hayashi ........... H04N 19/00569 375/240.16 |

FOREIGN PATENT DOCUMENTS

| EP | 2 582 331 A1 | 11/2012 |
| WO | 2007/129433 A1 | 11/2007 |

OTHER PUBLICATIONS

International Search Report issued in corresponding International application No. PCT/EP2014/051620, date of the actual completion of the International Search Mar. 12, 2014.

(Continued)

*Primary Examiner* — Nam Pham
(74) *Attorney, Agent, or Firm* — The Danamraj Law Group, P.C.; Thomas L. Crisman; Kenneth A. McClure

(57) ABSTRACT

A method of encoding video data including a sequence of digital image frames, in a pipelined processing system is provided. The method includes dividing each frame in the sequence into a plurality of sections, each section including a horizontal band across a frame. The method further includes subdividing each section into a plurality of macroblocks, and encoding a representation of each macroblock in each section to form an output stream. The sections of each frame are processed during adjacent steps in a pipeline of the pipelined processing system.

14 Claims, 4 Drawing Sheets

| Pipe step | 1 | 2 | 3 | 4 | 1 | 2 | 3 | 4 | 1 | 2 | 3 | 4 |
|---|---|---|---|---|---|---|---|---|---|---|---|---|
| GPU | IE A1 | IE B1 | IE C1 | IE D1 | IE A2 | IE B2 | IE C2 | IE D2 | IE A3 | IE B3 | IE C3 | IE D3 |
| CPU | | E A1 | E B1 | E C1 | E D1 | E A2 | E B2 | E C2 | E D2 | E A3 | E B3 | E C3 |
| HW | | | | ME A2 | ME B2 | ME C2 | ME D2 | ME A3 | ME B3 | ME C3 | ME D3 | ME A4 |
| GPU | | | | | MCP A2 | MCP B2 | MCP C2 | MCP D2 | MCP A3 | MCP B3 | MCP C3 | MCP D4 |

(56) References Cited

OTHER PUBLICATIONS

Written Opinion of the International Searching Authority issued in corresponding International application No. PCT/EP2014/051620, date of mailing Mar. 19, 2014.
Tung-Chien Chen, et al., "Hardware Architecture Design of an H.264/AVC Video Codec," 2006 IEEE Asia and South Pacific Conference on Design Automation, Piscataway, NJ, USA, Jan. 24, 2006, pp. 750-757, XP010901163; DOI: 10.1109/ASPDAC.2006.1594776; ISBN: 978-0-7803-9451-3.
Communication pursuant to Article 94(3) EPC in EP Application No. 13 305 197.9, dated Apr. 6, 2017, pp. 1-6.
Wei, Kaijin et al, "An Optimized Hardware Video Encoder for AVS with Level C+ Data Reuse Scheme for Motion Estimation," 2012 IEEE International Conference on Multimedia and Expo (ICME), IEEE, Jul. 9, 2012, pp. 1055-1060, Piscataway, NJ, USA.
Cheung, Ngai-Man et al, "Video Coding on Multicore Graphics Processors," IEEE Processing Magazine, Mar. 1, 2010, pp. 79-89, vol. 27, No. 2, Piscataway, NJ, USA.

* cited by examiner

| Pipe step | 1 | 2 | 3 | 4 | 1 | 2 | 3 | 4 | 1 | 2 | 3 | 4 |
|---|---|---|---|---|---|---|---|---|---|---|---|---|
| GPU | IE A1 | IE B1 | IE C1 | IE D1 | IE A2 | IE B2 | IE C2 | IE D2 | IE A3 | IE B3 | IE C3 | IE D3 |
| CPU |  | E A1 | E B1 | E C1 | E D1 | E A2 | E B2 | E C2 | E D2 | E A3 | E B3 | E C3 |
| HW |  |  |  | ME A2 | ME B2 | ME C2 | ME D2 | ME A3 | ME B3 | ME C3 | ME D3 | ME A4 |
| GPU |  |  |  |  | MCP A2 | MCP B2 | MCP C2 | MCP D2 | MCP A3 | MCP B3 | MCP C3 | MCP D4 |

FIG. 4

COMBINED PARALLEL AND PIPELINED VIDEO ENCODER

BACKGROUND

Technical Field

The described embodiments generally relate to an apparatus and method for providing combined parallel and pipelined video encoding. More particularly, the embodiments relate to apparatus and methods wherein video encoding is accomplished partly using software and partly using dedicated hardware in a combined parallel and pipelined manner.

The embodiments find applications in, in particular, handheld digital cameras and video cameras and mobile terminal systems, e.g., cell phones, smart phones, tablet computers which have a built-in video camera. The embodiments also find application in multimedia devices, such as set top boxes for digital television. The embodiments are applicable to various video encoding standards, for example the VPx (for example VP8) and H264 standards.

Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

As the resolution of cameras and displays increases, the requirements of real-time video encoding on, or for, such devices become increasingly demanding in terms of the required processing resource. Moreover, Video standards are evolving continuously with increasing requests in terms of quality, compression rate, input resolutions and real-time constraints. As a result these demanding requirements are subject to frequent change. For mobile devices, a further requirement is that such video encoding must also be power efficient.

Generally speaking, a dedicated hardware (HW) solution that is specific to the particular task will often provide the best solution in terms of processing performance and power efficiency. However, dedicated HW solutions are generally not particularly flexible since a new device must be developed for each change in the video parameters, such as an increase in resolution, or for a change to the standard employed for the encoding. Further, given the increased time taken to develop such solutions in comparison to software solutions, they are often not viable in a fast changing market.

Conversely, despite the increasing performance of Central processing units (CPUs), and a general increase in the number of embedded CPUs that are available on mobile platforms, purely software-based solutions are generally not able to provide sufficiently fast performance for high-resolution real-time video encoding. In addition, by increasing the CPU frequency to improve the performance, the power consumption of the device is also increased. Such an increase in power consumption can lead to poor battery life, difficulties in dissipating the power in a mobile device and even to damage to the device.

To improve processing performance, a system of parallel processing can be implemented either in the form of HW or software (SW). However, the data dependency inherent to video encoding algorithms makes the implementation of parallelism across several processing units difficult. As a result, it is not easy to realise the benefit of multiple CPUs on a mobile platform if parallelism is implemented in the form of a SW algorithm. Further, for efficient parallel processing, the processing units should exchange information rarely, generally not more than a few times per picture.

Accordingly, there is a need to provide video encoders for mobile devices that have the processing capability to achieve real-time video encoding whilst being sufficiently flexible to cope with changes to the encoding standard, and whilst operating at a low power.

US 2009 0274213 discloses a video encoding system based on intra-coding of blocks of pixels within images in the video sequence.

It is an aim of the embodiments herein described to overcome or mitigate at least some of the above described limitations.

SUMMARY

In a first aspect according to an embodiment, there is provided a method of encoding video data in a pipelined processing system, the video data comprising a sequence of digital image frames, the method comprising: dividing each frame in the sequence into a plurality of sections, each section comprising a horizontal band across a frame, subdividing each section into a plurality of macroblocks, and encoding a representation of each macroblock in each section to form an output stream, wherein the sections of each frame are processed during adjacent steps in a pipeline of the pipelined processing system.

Thus, advantageously, the processing of frames within the sequence can be divided and processed efficiently in a pipelined manner.

In alternative or complementary embodiments, the number of sections into which a frame is divided is equal to a number of processing steps in the pipeline. Thus, advantageously, the method can ensure that the pipeline is efficiently filled.

In alternative or complementary embodiments, each section comprises substantially the same number of pixels. Thus, advantageously, the same processing resource and configuration can be implemented for each section.

In alternative or complementary embodiments, the representation of each macroblock is generated using a process of intra-estimation or motion prediction and compensation.

In alternative or complementary embodiments, the number of sections per frame is 4. Thus, advantageously the encoding task can be divided into 4 parallel processes. Increasing the number of parallel processes into which a given task is divided tends to decrease the time taken for each process. However, conversely, dividing the task into more processes has the effect of increasing the pipeline synchronization requirement between sections within a frame. In turn this tends to cause overhead delays as this necessarily requires interrupt processing on the host. Thus, by selecting the number of sections to be 4, a balance between processing the frame in a parallel manner and generating synchronisation delays by dividing the frame can be made.

In alternative or complementary embodiments, for each macroblock, either the intra-estimated or the inter-estimated representation is selected for encoding in the output stream. Thus, advantageously, the best representation for a particular macroblock can be selected for encoding.

In alternative or complementary embodiments, the intra-estimation representation for each macroblock is generated using the corresponding pixels from the original frame in the sequence. Thus, advantageously, a data dependency for intra-estimation representations of different macroblocks in a frame can be avoided since the intra-estimation representations do not in general rely on one another.

In alternative or complementary embodiments, the motion estimation and prediction representation for each macroblock is generated from a previously encoded frame in the sequence.

In alternative or complementary embodiments, the motion compensation and prediction comprises generating a motion estimation for each macroblock or sub-macroblock.

In alternative or complementary embodiments, the intra-estimation and motion compensation are performed on a graphics processor, the encoding is performed in software and the motion estimation is performed in dedicated hardware. Thus, advantageously, the different processing tasks can be assigned to the processing resource that is most suited to implementing that particular task.

In a second aspect, there is provided a pipelined processing apparatus for encoding video data comprising a sequence of digital image frames, the apparatus comprising: means for dividing each frame in the sequence into a plurality of sections, each section comprising a horizontal band across a frame, means for subdividing each section into a plurality of macroblocks, and means for encoding a representation of each macroblock in each section to form an output stream, wherein the sections of each frame are processed during adjacent steps in a pipeline of the pipelined processing system.

Advantageously, the apparatus of the second aspect can be embodied in a portable device comprising one or more of a mobile telephone, a tablet computer a digital camera or a digital video camera.

A further aspect relates to a computer program product comprising computer readable instructions which, when run on a computer system, cause the computer system to perform the method of the first aspect. A further aspect relates to a computer readable medium comprising the computer program product of the previous aspect.

BRIEF DESCRIPTION OF THE DRAWINGS

The present invention is illustrated by way of example, and not by way of limitation, in the Figures of the accompanying drawings, in which like reference numerals refer to similar elements and in which:

FIG. 4 illustrates details of the order of steps that are carried out in the method of FIG. 3.

DETAILED DESCRIPTION

Figure 1:
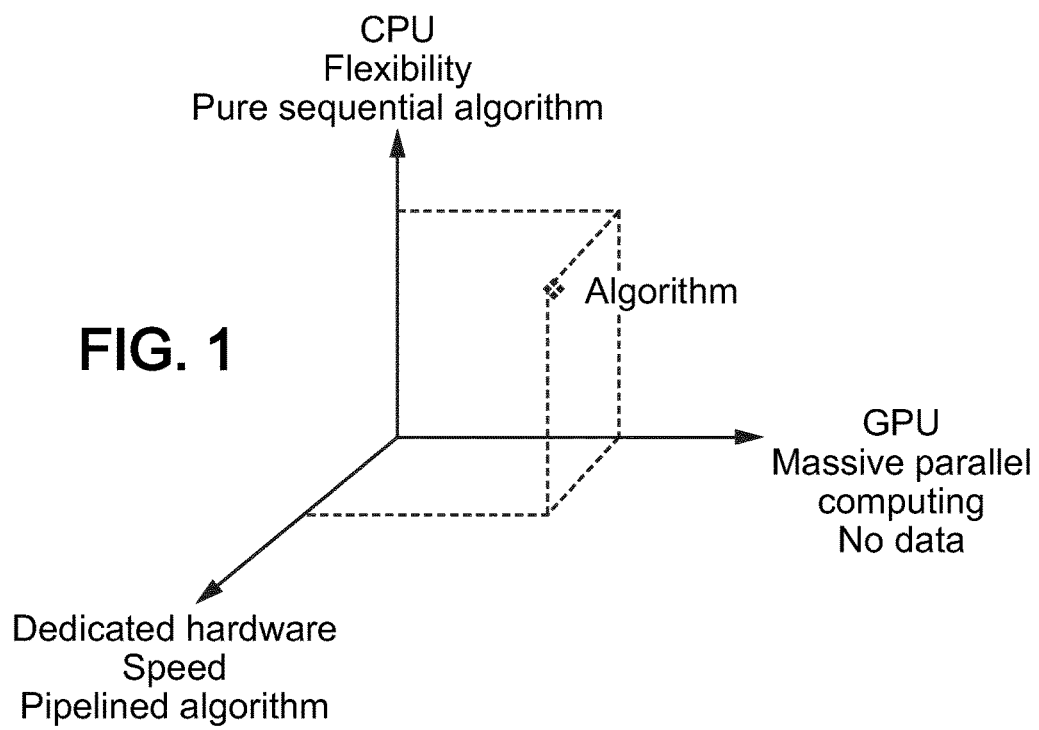
FIG. 1 illustrates the trade-offs that apply when configuring a video encoding method in different manners.

FIG. 1 illustrates the trade-off between different manners in which a video encoding method can be implemented. As illustrated in FIG. 1, by using a purely software-based solution, a high degree of flexibility can be achieved. However, such a solution will use a sequential algorithm, and so tend to be slow. Alternatively, if a purely GPU-based solution is implemented then this will permit massively parallel computing. However such a solution does not enable easy handling of the data dependency. Finally, if a dedicated HW solution is implemented, then this will permit high-speed processing speed via a pipelined algorithm. However, as discussed above, such a solution suffers from a lack of flexibility.

By combining elements of each solution i.e. SW, HW and GPU, the embodiment as described below is able to achieve a flexible processing system that retains the performance advantage of GPU and HW-based solutions.

Figure 2:
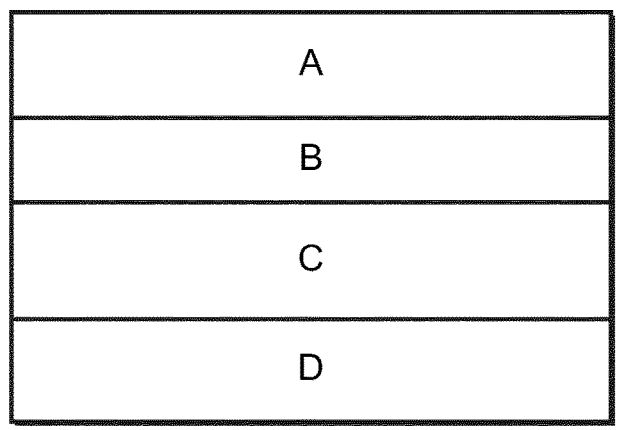
FIG. 2 illustrates a method of dividing a frame in a sequence of images for processing in accordance with a described embodiment.

FIG. 2 illustrates a method of dividing a frame in a video sequence for encoding according to an embodiment. Throughout this description, the term 'frame' is used to describe a single image from a sequence of images that together form a video sequence. As illustrated in FIG. 2, the frame is divided horizontally into a plurality of non-overlapping sections (A, B, C, D). A data dependency exists at the boundary between each section since, during processing of a particular section, some of the frame information from each section adjacent to that particular section is required. As a result, during processing of a frame, there is a synchronisation requirement between the different sections.

By dividing the frame into a greater number of sections, the frame can be processed in a greater number of parallel processing streams since, for example, one stream could be employed per section. However, using a greater number of sections will necessarily increase the number of section boundaries within the divided frame, and thus the synchronisation requirement between sections within the frame is also increased. Also, the processing method illustrated in FIG. 2 is feasible only if the motion vector search window size is limited to co-located and adjacent layers in previous pictures. This is described in greater detail in relation to FIG. 3 below. Thus, employing a greater number of sections would result in a reduction to the maximum allowed motion vector size. This in turn would reduce the encoding quality. In view of the above, the skilled person will recognise that a trade-off exists between increasing the number of processing streams by increasing the number of sections, and reducing the synchronization requirement between sections of the frame by reducing the number of divisions in the frame. With this trade-off in mind, in FIG. 2 the number of sections is 4. However, the skilled person will recognise that a larger or smaller number of sections can be used dependent on the particular constraints and parameters of a particular frame encoding system.

As noted above, by dividing frames horizontally into four sections, each frame can be processed in a parallel manner with each section being processed separately. A method of horizontal division of frames is selected rather than a vertical division, since horizontal division is better suited to standard formats for transmission of frame data. For example, frame data is often transmitted in the form of (horizontal) lines of a picture, with one line following the line immediately above it. Thus, by dividing a frame into horizontal sections, there may be no need to wait to receive a complete frame before generating at least some of the sections and commencing encoding of the frame.

Within each section of the frame, the frame is further divided into a number of macroblocks. In the presently described embodiment, each macroblock is of size 16×16 pixels. However, the skilled person will recognise that macro blocks of different sizes can also be implemented. Moreover, the skilled person will also recognise that methods described here can also be applied to macroblocks that are in turn subdivided into smaller blocks (partitions or sub blocks).

As an example of the use of macroblocks within a frame, consider a frame in a sequence of frames that has a resolution of 1,280 pixels in a width direction and 1,024 pixels in a height direction. If macroblocks of size 16×16 pixels are employed, then this frame would be composed of an array of macroblocks that is 80 macroblocks wide and 64 macroblocks high. The total number of macroblocks per frame is 5,120 (i.e. 80*64). Each frame section will be composed of an array of macroblocks that is 80 macroblocks wide and 16 macroblocks high. The total number of macroblocks per frame section is 1280.

Figure 3:
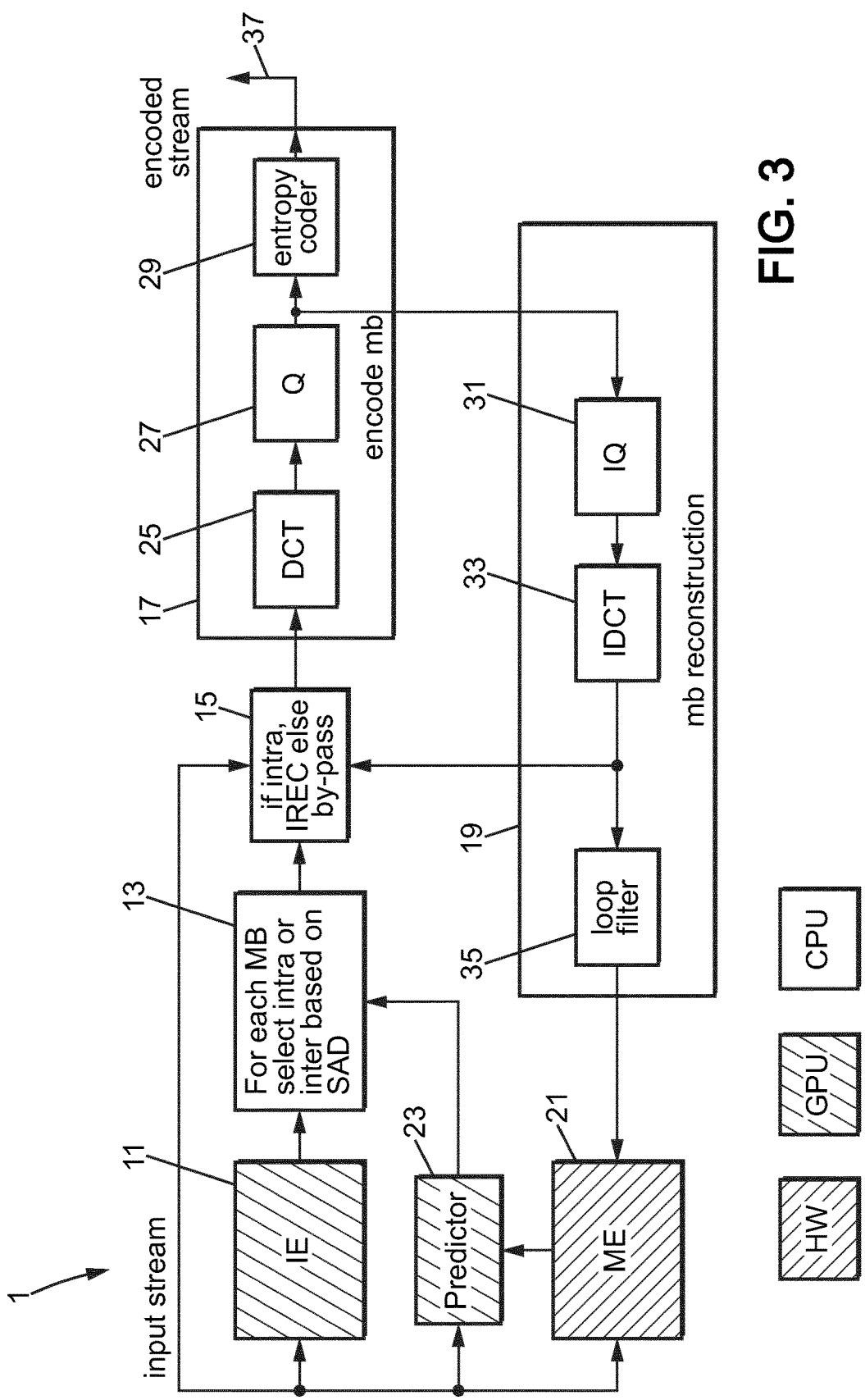
FIG. 3 illustrates a video encoding method in accordance with a described embodiment.

FIG. 3 illustrates a video encoding method in accordance with an embodiment. The described encoding method is implemented in the form of a pipeline. The input 1 to the encoding method takes the form of a stream of pixels to be encoded. This stream of pixels represents a sequence of frames (images) that together form a video sequence. As noted above, each frame is broken down into a collection of macroblocks. Thus, the input 1 to the encoding method comprises a stream of pixels that are grouped into macroblocks.

The output from the method takes the form of an encoded video stream 37 that is formed using the process described below.

The input 1 is input in parallel fashion to an intra-estimator (IE) 11, a by-pass module 15, a motion estimator 21 and a predictor 23. The IE 11 uses a method of intra-estimation to determine areas within a frame that contain spatial redundancy. The IE 11 performs the intra-estimation on the original pixels that form the input frame. Since the original pixels are employed for this, there is no data dependency between a current macroblock to be estimated and its neighbours.

This intra-estimation achieved by using a method wherein the content of a current macroblock is predicted, or estimated, by extrapolation of the pixel values from one or more adjacent macroblocks. Typically, the IE 11 uses the vertical column of pixels from the right-hand-side of the previous macroblock (i.e. the macroblock located immediately to the left of the current macroblock) and the horizontal line of pixels from the lower-side of the macroblock located immediately above the current macroblock to predict the content of the current macroblock. However, the skilled person will recognise that other methods of intra-estimation are equally applicable. The skilled person will also understand methods of implementing intra-estimation, and so a fuller explanation will not be included here. In the described embodiment, the IE 11 makes three versions of the intra-estimated macroblock; one based on horizontal intra-estimation, one based on vertical intra-estimation and one based on diagonal intra-estimation. The IE then selects the most suitable version for output. To do this, the IE 11 makes a calculation of the sum of the absolute difference (SAD) between the pixels represented by each version of the intra-estimated macroblock and the original pixels of the macroblock. In the described embodiment, the version that has the lowest SAD forms the output of the IE 11, together with its associated SAD. The SAD is used during the encoding process as is explained below.

The skilled person will recognise that the IE 11 need not perform three different intra-estimations. Rather, a larger or smaller number of intra-estimations can equally be employed.

The resulting output from the IE 11 takes the form of a series of estimated macroblocks, together with a measure of the difference between each estimated macroblock and the actual block. This output is passed to a decision module 13. The decision module 13 receives both the output from the IE 11 and an output from a predictor module 23 that supplies an inter-estimated version of each macroblock, and a SAD calculated for the inter-estimated macroblock. The method of derivation of the inter-estimated macroblock will be described below. The decision module 13 determines for each macroblock whether to use the intra-estimated version of the macroblock from the IE 11 in the encoded video stream, or to use the inter-estimated version of the macroblock from the predictor 23.

The decision made in the decision module 13 is made on a per-macroblock basis. Each decision is based on a comparison of the two SAD values derived for the intra-estimated version of a macroblock and the inter-estimated version of the macroblock. In the described embodiment, whichever has the lowest value of the SAD will be the version of the macroblock that is employed in the encoded stream 37 for that particular macroblock in the frame. The winning prediction from this decision forms the output from the decision module 13. The skilled person will understand that other intra/inter selection criteria may also be used, and that a SAD based decision is given here only as an example.

The output from the decision module 13 is then passed to a by-pass module 15. As noted above, the by-pass module 15 also receives the input stream 1. As a further input, the by-pass module 15 also receives an output from a macroblock reconstruction module 19. The macroblock reconstruction module will be described in further detail below.

The by-pass module 15 is configured to either perform an intra-frame reconstruction (IREC) on the input macroblock, or to select the predictor 23 output (i.e. to by-pass). The determination of whether to perform an IREC macroblock or to by-pass is based on whether the macroblock is intra-estimated or inter-estimated. The by-pass module 15 is configured such that it is by-passed if the selected macroblock is inter-estimated. If the macroblock is intra-estimated, then a new intra-estimated macroblock based on a reconstructed picture needs to be computed by using the selected intra-mode. This is because the intra-estimated macroblock has been computed based on the original pixels of the input stream 1. This IREC step is carried out by the by-pass module 15, and employs reconstructed macroblocks from the macroblock reconstruction module 19 as described below.

After either performing the IREC, or by-passing, the by-pass module 15 then computes the residual error between the estimated macroblock (intra or inter) and the corresponding pixels in the input stream 1. This calculation is on a pixel-by-pixel basis. The residual errors are then passed on to the encoding module 17, the function of which is described below.

The macroblock reconstruction is performed just after the step of encoding the macroblock on the CPU. Generally, it is expected that intra-estimated macroblocks will be statistically selected for encoding much less frequently than the inter-estimated macroblocks, and that the intra-estimated macroblock prediction will only be carried out for the selected intra-mode. Therefore, this step will consume much less CPU resources than a full intra-estimation based on reconstructed pixels. However, this will be at the cost of some degradation to the encoding efficiency.

The encoding module 17 is configured to encode the residual errors from intra-estimated or inter-estimated macroblock from the by-pass module 15 into an encoded bitstream 37 to act as the output 37. The encoding module 17 comprises a discrete cosine transform (DCT) module 25, a quantisation module 27 and an entropy coder 29. The DCT module performs a DCT on the received residual errors. The skilled person will understand how to implement a DCT, and so a fuller explanation will not be provided here. Rather, it is sufficient to state that the action of the DCT is to express the pixel data within each macroblock in the form of an array that contains a series of cosine functions, each of which has a particular amplitude and frequency. In other words, the DCT converts pixel data from the spatial domain to a frequency domain. Thus, the output of the DCT module 25 is of the form of an array of coefficients that express the amplitudes and frequencies present in the series. This output is then passed to the quantisation module 27. The quantisation module 27 quantises the coefficients output from the DCT module 25.

The skilled person will recognise how to perform such quantisation, and so further explanation of the quantisation module 27 will not be repeated here. The quantised coefficients are then output to the entropy encoder 29.

The entropy encoder 29 encodes the coefficients output from the quantisation module 27 to form the encoded stream 37. The skilled person will recognise how to implement an entropy encoder, and so a fuller explanation will not be provided here.

The output from the quantisation module 27 is also sent to the macroblock reconstruction module 19 mentioned above. The macroblock reconstruction module 19 comprises an inverse quantisation module 31, an inverse discrete cosine transform (IDCT) module 33 and a loop filter 35.

The inverse quantisation module 31 receives the output from the quantisation module 27 and performs an inverse quantisation process on the quantised output. The IDCT module 33 then performs an inverse DCT on the output of the inverse quantisation. The skilled person will recognise how to implement both of these processes, and so a full explanation will not be repeated here. Rather, it is sufficient to note that the output from the IDCT module 33 takes the form of reconstructed macroblocks.

The output from the IDCT module 33 is passed to a loop filter 35. The loop filter 35 functions to remove artefacts that can arise from a situation where adjacent macroblocks were encoded using different estimation techniques. For example, if a first macroblock was encoded using motion-estimation, while a second, adjacent macroblock was encoded using intra-estimation, then an artefact can be present at the boundary between these macroblocks. The skilled person will understand how to implement a loop filter, and so a more detailed explanation will not be provided here.

The output from the IDCT module 33 is also passed to the by-pass module 15. Thus, as described above, the by-pass module 15 can utilise the reconstructed macroblocks from the IDCT 33 as part of the calculation of the residual errors described above.

The output from the loop filter 35 is passed to a motion estimator (ME) 21. The ME 21 takes the reconstructed, loop filtered, macroblocks and performs motion estimation on each macroblock to determine motion estimation of the macroblock with respect to either a previous frame or with respect to both a previous and a future frame. As noted above, the ME 21 also receives the input stream 1, for use in generating the motion estimation for each macroblock. The ME 21 derives the best estimate of the motion vector for the current macroblock. The best motion vector here is assumed to be that which produces the lowest SAD between the estimated macroblock and the macroblock(s) on which the motion estimation is made. The skilled person will recognise how to implement such motion estimation using these inputs, and so a full explanation will be omitted here. The output of the ME 21 takes the form of an estimated macroblock, together with its corresponding SAD.

The output from the ME 21 is passed to the predictor 23, which computes a motion compensated frame based on the best motion vector for each macroblock or sub-macroblock.

The predictor 23 passes the inter-predicted macroblock and associated SAD to the decision module 13. As is described above, the result of this SAD comparison in the decision module is then used to determine which version of the macroblock it passed to the encoder 17 for inclusion within the encoded stream 37.

Thus, in summary, the method functions as follows: Intra-estimated and motion estimated versions of each macroblock are determined, and the version having the lowest SAD is chosen for encoding. The selected version of the macroblock is then encoded and used in the output stream 37.

In an alternative embodiment a bias is added to the SAD criterion used to make the determination between using an intra-estimated macroblock or an inter-estimated macroblock. Thus, in this embodiment the following relation is used to make the determination between the intra encoded version of the macroblock and the inter-estimated version:

If $SAD_{intra-estimated}+bias>SAD_{inter-estimated}$, then select inter-estimated else, select intra estimated.

where $SAD_{intra-estimated}$ represents the SAD calculated from the intra-estimated macroblock and $SAD_{inter-estimated}$ represents the SAD calculated from the inter-estimated macroblock.

Such an embodiment can be used to help ensure that a desired fraction of the macroblocks are encoded by a particular method.

In the embodiment described in FIG. 3, the IE module 11 and the predictor 23 are both implemented in a GPU. The ME module 21 is implemented in HW, and the remaining components, i.e. the MB encoder module 17, the MB reconstruction module 19, the decision module 13 and the by-pass module 15 are all implemented in SW. Thus, each of the different functions of the encoder described can be implemented in the manner to which it is most suited. Accordingly, the described encoder can make optimal use of the available HW resources whilst retaining functionality that is subject to frequent change within a SW environment, running on a CPU or a GPU. Further, the encoding process is able to operate in a manner that is both parallel and pipelined.

FIG. 4 illustrates the steps that occur when processing frames of data using the encoding method of FIG. 3. The top row of the Figure indicates the step in the pipeline. This is in a repeating pattern of 1, 2, 3, 4. Thus, the pipeline is divided into four steps of processing for each frame and the processing is repeated for each frame. Between each pipeline step, synchronisation is required, and so an interrupt occurs on the CPU of the processing system.

The second row indicates steps carried out by the GPU. The first step, at pipeline step 1 is to perform intra-estimation on a first section of a first frame. This section is labelled A1, which indicates that this is section A of the first frame in the sequence that is being encoded. Thus, this frame is the top section of the frame shown in FIG. 2. The subsequent step in the second row, in other words the subsequent step for the GPU, is to perform intra-estimation on section B of the first frame, this is labelled B1. In other words, section B1 is the section below section A1 the first frame of the sequence. The third step for the GPU is processing of section C in frame 1, i.e. C1. Subsequently, section D1 is processed. After processing each section of the first frame, the GPU then processes the sections of the second frame in the same order as for the first frame. In other words, sections A2, B2, C2 and then D2 are processed.

In the third row of the table of FIG. 4, the CPU performs macroblock encoding and macroblock reconstruction of the first section, A1. In FIG. 4, this processes is labelled 'E'. The CPU carries out this processing at step 2 of the pipeline, in other words at the time when the GPU is performing intra-estimation of section B1. This is because the macroblock encoding and macroblock reconstruction processes require the result of the intra-estimation on section A1, and so cannot commence prior to the result being available. The subsequent step for the CPU is to perform processes E (macroblock encoding and macroblock reconstruction) on section B1 during pipeline step 3. The CPU then performs process E on frame sections in the same order as the GPU, each section being processed one pipeline step after the section has been processed by the GPU.

In the fourth row of FIG. 4, the HW performs motion estimation. The motion estimation for section A of the second frame (i.e. A2) is made in relation to the corresponding section in the first frame, A1. Thus, no motion estimation is made for the first frame since there is no previous frame for generation of the motion estimation. As noted in relation to FIG. 3, the subsequent step to motion estimation is motion prediction, and subsequent to that the decision module 13 compares the SAD of the intra-estimated and motion-compensated macroblocks. In contrast, each intra-estimated macroblock is compared in the decision module 13 in the step immediately after intra-estimation, in process E immediately before macroblock encoding. Thus, the motion-estimation of a particular macroblock is required one step prior to the intra-estimation for the same macroblock. Accordingly, the motion-estimation of section A2 is carried out in step 4 of the pipeline, while motion estimation of section B2 is carried out in the subsequent step of the pipeline, in other words during the first step in the next repetition of the pipeline. Motion estimation of section B2 is carried out in the next step of the pipeline, and the following steps are motion estimation on C2 and D2 in that order.

In the fifth row of FIG. 4, the motion compensated prediction (MCP) is carried out by the GPU. Since the MCP relies on the result of the motion estimation in row 4, it is carried out one pipeline step after the motion estimation for each particular macroblock. Thus, the MCP for section A2 is carried out at the second instance of pipeline step 1, in other words on the fifth step in the pipeline since commencement of the pipeline. In the subsequent steps, MCP for B2, then C2 and then D2 are carried out in that order.

As can be seen from FIG. 4, the first four steps are effectively initiation of the pipeline since not all of the required data for the described macroblock encoding method is available until after these first four steps. From this, it is clear that the first frame, which is formed of sections A1, B1, C1 and D1 cannot be treated in exactly the same manner as the remaining frames in the sequence. Typically, the first frame in a sequence is fully encoded with intra-estimated macroblocks. However, the skilled person will recognise other methods for dealing with this issue, and so a full explanation of the possible methods will not be repeated here.

As is clear from FIG. 4, each of the four sections of the frame, A, B, C, D are processed in a parallel and pipelined manner. Since there are four tasks to be completed in each repetition of the pipeline (IE, E, ME and MCP), efficient processing can be achieved by dividing the frames to be encoded into four sections. By choosing to divide the frames into four sections, the pipeline of the described embodiment is "full", in the sense that processing can take place during each step in the pipeline. After the initiation steps, here are no steps in which one processing element (GPU, CPU or HW) must wait for processing to finish elsewhere. The skilled person will recognise that the encoding method can alternatively be split into a larger or smaller number of tasks, each of which can be carried out in a different piece of HW or SW (CPU or GPU). In such a situation, the input frames can be divided into a number of sections corresponding to the number of processing tasks. Accordingly, the pipeline can be maintained in a full state.

Figure 5:
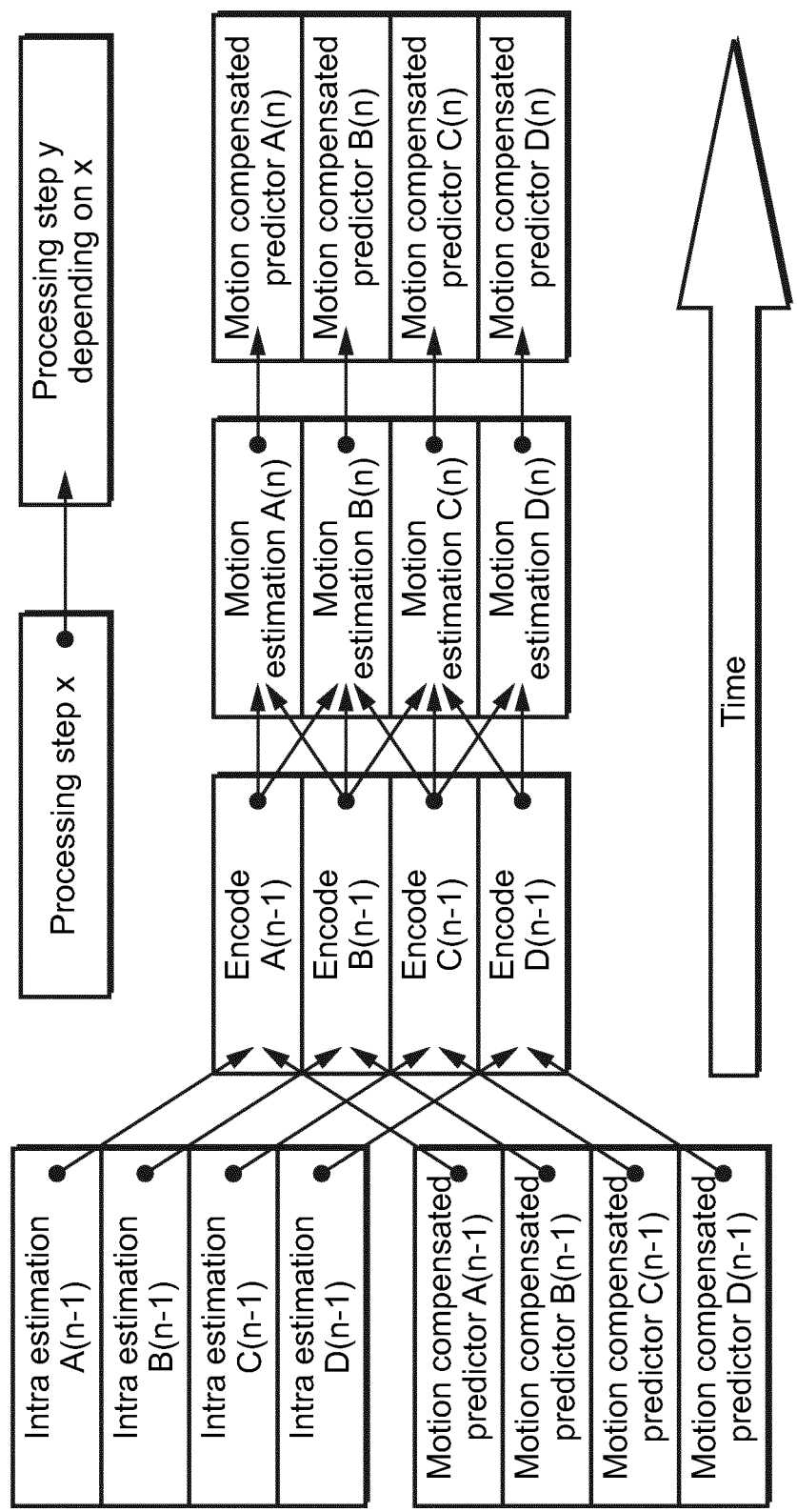
FIG. 5 illustrates the dependencies between the data used in the method of FIG. 3.

FIG. 5 shows the interrelationship between the processing steps in FIGS. 3 and 4 in more detail. As can be seen from FIG. 5, to encode section A(n−1) where n denotes the frame number as used above, the method requires the intra-estimation and motion compensated prediction for this section. In a corresponding manner, to encode section B(n−1), the intra estimation and motion compensated prediction for section B(n−1) are required. The requirements for C(n−1) and D(n−1) also correspond to these requirements. Subsequently, to then generate the motion estimation for section A(n), encoded sections A(n−1) and B(n−1) are used since motion can cross section boundaries. From the motion estimation of A(n), the MCP of A(n) can then be derived.

To generate the motion estimation for section B(n), encoded sections A(n−1), B(n−1) and C(n−1) are all used since both sections A and C have boundaries with section B. For the purposes of this embodiment, it is assumed that motion vectors are restricted to the same and adjacent sections in the frame previous to the current frame.

From the motion estimation of B(n), the MCP of B(n) can then be derived. Similarly, to generate the motion estimation for section C(n), encoded sections B(n−1), C(n−1) and D(n−1) are all used. From the motion estimation of C(n), the MCP of C(n) can then be derived. To generate the motion estimation for section D(n), encoded sections C(n−1) and D(n−1) are used. From the motion estimation of D(n), the MCP of D(n) can then be derived.

Thus, as can be seen from FIG. 5, the MCP for, for example, A3 ultimately relies on the result of the IE for A2 and B2 and also the MCP of A2 and B2. Since there are four 'tasks' into which the encoding is divided (IE, E, ME and MCP), the earliest that the MCP for A3 can be calculated is four pipeline steps after the result of IE for A2. Thus, the pipeline will be exactly filled in this embodiment if each frame is divided into four sections.

The skilled person will recognise that by implementing the encoding method as described above, the different processing units need only be synchronised four times per frame, once at the end of each processing step. Each synchronisation requires a SW interrupt, and so by reducing the synchronisations to such a small number, the efficiency of encoding method is enhanced.

The skilled person will recognise that embodiments can be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium.

The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method for encoding video data in a pipelined processing system, the video data including a sequence of digital image frames, the method comprising:
   provisioning a pipelined video encoding process into a plurality of parallel tasks;
   dividing each frame in the sequence into a plurality of sections, each section comprising a horizontal band across a frame;
   subdividing each section into a plurality of macroblocks; and
   encoding a representation of each macroblock in each section to form an output stream,
   wherein the number of sections into which a frame is divided is equal to the number of parallel tasks and further wherein data from an $i^{th}$ section of each frame is processed during an $i^{th}$ pipeline step in a repeating pattern for at least one of the parallel tasks of the pipelined video encoding process.

2. The method according to claim 1, wherein the at least one of the parallel tasks is an intra-estimation (IE) task that is performed for the $i^{th}$ section of each frame at the $i^{th}$ step in the pipeline.

3. The method according to claim 1, wherein each section comprises substantially a same number of pixels.

4. The method according to claim 1, wherein representations of each macroblock are generated using a process of intra-estimation and motion prediction and compensation.

5. The method according to claim 1, wherein a number of sections per frame is 4.

6. The method according to claim 4, wherein the intra-estimation representation for each macroblock is generated using corresponding pixels from an original frame in the sequence.

7. The method according to claim 4, wherein the inter-estimation for each macroblock is generated from a previously encoded frame in the sequence.

8. The method according to claim 4, wherein, for each macroblock, either an intra-estimated or an inter-estimated representation is selected for encoding in the output stream.

9. The method according to claim 5, wherein the motion prediction and compensation comprises generating a motion estimation for each macroblock.

10. The method according to claim 9, wherein the intra-estimation and motion compensation are performed on a graphics processor, the encoding is performed on a central processor and the motion estimation is performed in dedicated hardware.

11. A pipelined-processing apparatus for encoding video data including a sequence of digital image frames, the apparatus comprising:
    one or more processors; and
    one or more non-volatile memory modules coupled to the one or more processors, the one or more non-volatile memory modules having program instructions for performing the following acts when executed by the one or more processors;
    provisioning a pipelined video encoding process into a plurality of parallel tasks;
    dividing each frame in the sequence into a plurality of sections, each section comprising a horizontal band across a frame;
    subdividing each section into a plurality of macroblocks; and
    encoding a representation of each macroblock in each section to form an output stream,
    wherein the number of sections into which a frame is divided is equal to the number of parallel tasks and further wherein data from an $i^{th}$ section of each frame is processed during an $i^{th}$ pipeline step in a repeating pattern for at least one of the parallel tasks of the pipelined video encoding process.

12. The pipelined-processing apparatus according to claim 11, wherein the pipelined-processing apparatus is embodied in a device comprising one or more of a mobile telephone, a tablet computer, a digital camera, a digital video camera, a multimedia device or a set-top box.

13. A computer program product stored in a non-transitory computer readable medium comprising computer readable instructions which, when run on a computer system, cause the computer system to perform a method for encoding video data in a pipelined processing system, the video data including a sequence of digital image frames, the method comprising:
    provisioning a pipelined video encoding process into a plurality of parallel tasks;
    dividing each frame in the sequence into a plurality of sections, each section comprising a horizontal band across a frame;
    subdividing each section into a plurality of macroblocks; and
    encoding a representation of each macroblock in each section to form an output stream,
    wherein the number of sections into which a frame is divided is equal to the number of parallel tasks and further wherein data from an $i^{th}$ section of each frame is processed during an $i^{th}$ pipeline step in a repeating pattern for at least one of the parallel tasks of the pipelined video encoding process.

14. A non-transitory computer readable medium storing executable codes, which, when run on a computer system, cause the computer system to perform a method for encoding video data in a pipelined processing system, the video data including a sequence of digital image frames, the method comprising:

provisioning a pipelined video encoding process into a plurality of parallel tasks;

dividing each frame in the sequence into a plurality of sections, each section comprising a horizontal band across a frame;

subdividing each section into a plurality of macroblocks; and encoding a representation of each macroblock in each section to form an output stream, wherein the number of sections into which a frame is divided is equal to the number of parallel tasks and further wherein data from an $i^{th}$ section of each frame is processed during an $i^{th}$ pipeline step in a repeating pattern for at least one of the parallel tasks of the pipelined video encoding process.

* * * * *